(12) United States Patent
Jiang

(10) Patent No.: US 12,294,690 B2
(45) Date of Patent: May 6, 2025

(54) NAKED-EYE 3D DISPLAY FILM STRUCTURE

(71) Applicant: He-Yuan Jiang, New Taipei (TW)

(72) Inventor: He-Yuan Jiang, New Taipei (TW)

( * ) Notice: Subject to any disclaimer, the term of this patent is extended or adjusted under 35 U.S.C. 154(b) by 280 days.

(21) Appl. No.: 18/162,921

(22) Filed: Feb. 1, 2023

(65) Prior Publication Data

US 2024/0259546 A1 Aug. 1, 2024

(51) Int. Cl.
*G09G 3/36* (2006.01)
*G02B 5/04* (2006.01)
*G02B 30/25* (2020.01)
*G02F 1/1335* (2006.01)
*H04N 13/32* (2018.01)

(52) U.S. Cl.
CPC ............... *H04N 13/32* (2018.05); *G02B 5/04* (2013.01); *G02B 30/25* (2020.01); *G02F 1/133507* (2021.01); *G09G 3/36* (2013.01); *G09G 2320/0626* (2013.01)

(58) Field of Classification Search
CPC .......... G02B 30/25; G02B 30/27; G02B 5/04; H04N 13/305; G02F 1/133507
See application file for complete search history.

(56) References Cited

U.S. PATENT DOCUMENTS

| | | | |
|---|---|---|---|
| 6,369,949 B1 * | 4/2002 | Conley | G02B 3/04 359/619 |
| 2007/0035829 A1 * | 2/2007 | Woodgate | G02B 30/27 348/E13.044 |
| 2008/0180586 A1 * | 7/2008 | Tomizuka | G02F 1/133526 349/15 |
| 2019/0018254 A1 * | 1/2019 | Tan | G02B 30/27 |
| 2022/0311990 A1 * | 9/2022 | Makinen | H04N 13/31 |

FOREIGN PATENT DOCUMENTS

WO  WO-2016017492 A1 *  2/2016  ............... G02B 6/00

\* cited by examiner

*Primary Examiner* — Jayanti K Patel
*Assistant Examiner* — Christopher Kingsbury Glover
(74) *Attorney, Agent, or Firm* — Rosenberg, Klein & Lee

(57) ABSTRACT

A naked-eye 3D display film structure includes a polarization component and a light column lens assembly overlaid on the polarization component. The light column lens assembly has multiple arc-column-shaped lenses sequentially connected with each other. A hetero-component is disposed between each two adjacent arc-column-shaped lenses. The arc-column-shaped lenses and the hetero-components are sequentially connected with each other and periodically arranged. The hetero-components serve to enhance the intensity of the emergent light outgoing from the gaps periodically arranged between the arc-column-shaped lenses and destruct the forming condition of the Moiré pattern so as to reduce the periodical contrast of the emergent light of the respective arc-column-shaped lenses. Accordingly, the naked-eye observation 3D image quality and effect are enhanced.

11 Claims, 6 Drawing Sheets

NAKED-EYE 3D DISPLAY FILM STRUCTURE

BACKGROUND OF THE INVENTION

1. Field of the Invention

The present invention relates generally to a field of 3D display technique, and more particularly to a naked-eye 3D display film structure, which can effectively enhance naked-eye observation 3D image quality and effect.

2. Description of the Related Art

A conventional stereo display device mainly serves to utilize a specific digital processing to present a stereo vision effect for an observer. The stereo vision means that when an observer watches an object with both eyes, the observer can feel and distinguish between the distances from the object to the observer as well as the configurations of the object. The left and right eyes of the observer respectively perceive different images. After the images are overlapped in the brain, the observer can sense the layering and depth of field of the object so as to experience a stereo feeling of the object. Accordingly, the stereo display device needs to separate the left eye signal from the right eye signal for the human left and right eyes to independently perceive. In this case, when the observer watches the object, the observer can have a stereo vision of the object.

In the recent years, various products employing liquid crystal displays as information real-time output interfaces have been continuously renewed, such as PDA, cellular phone, satellite navigation system, digital camera, liquid crystal television, etc. Therefore, the naked-eye 3D stereo display technique has been rapidly developed and the requirements of consumers for naked-eye 3D image display effect have become higher and higher. The basic principle of naked-eye 3D display is to utilize interruption, refraction and the like method for partially guiding light beam to make both eyes see two images with parallax information so as to achieve a stereo visual effect. For example, in the case that the naked-eye 3D film is selectively a column-shaped lens grating for displaying stereo image, by means of the spectral effect of the column-shaped lens, two images with parallax information processed by a specific method are respectively projected onto the left and right eyes. That is, the left eye perceives the light beam from the pixel for the left eye to watch, while the right eye perceives the light beam from the pixel for the right eye to watch, whereby the light beams form images on the retinas of the left and right eyes respectively. The images are then processed by the brain system to obtain the parallax information and form the stereo vision.

When a conventional column-shaped lens grating is used to display stereo images, the prisms and the pixels on the display are both periodically arranged. As shown in FIG. 5, the period of the prisms is p, while the period of the pixels is $\delta p$. In the case that the period of the prisms is proximate to or proximately times the period of the pixels, when the prisms are superimposed on the pixels, Moiré pattern phenomenon with a period L is visually produced. After the prisms are superimposed on the pixels, the period becomes $p+\delta p$. The Moiré pattern produced after the periodically arranged light columns are superimposed on the periodically arranged pixels results in a problem existing in the conventional technique. As shown in FIG. 6, when the light beam is deflected by the column-shaped lens to the left eye or the right eye, the right eye will perceive the light beam coming from the right pixels without perceiving the light beam emitted from the left pixels on the screen, which is previously set to be projected onto the left eye. Therefore, with respect to the right eye, the left pixels form an area periodically without any emergent light. In this case, the light beam passing through the gap between the column-shaped lenses cannot be projected onto the right eye, and vice versa. The combination of the phenomenon that periodically no emergent light outgoes from the pixels and the periodically arranged gaps A of the naked-eye 3D display film will lead to the Moiré pattern. As a result, the configurations and colors in the images will be distorted. Accordingly, the conventional naked-eye 3D display film can hardly achieve an idealistic naked-eye 3D effect.

SUMMARY OF THE INVENTION

It is therefore a primary object of the present invention to provide a naked-eye 3D display film structure, which can effectively destruct the forming condition of the Moiré pattern and reduce the periodical contrast of the emergent light of the respective arc-column-shaped lenses so as to enhance the naked-eye observation 3D image quality and effect.

To achieve the above and other objects, the naked-eye 3D display film structure of the present invention includes a polarization component and a light column lens assembly overlaid on the polarization component, wherein:

The light column lens assembly has multiple arc-column-shaped lenses sequentially connected with each other. A hetero-component is disposed between each two adjacent arc-column-shaped lenses. The arc-column-shaped lenses and the hetero-components are sequentially connected with each other and periodically arranged. The hetero-components serve to enhance the intensity of the emergent light outgoing from the gaps periodically arranged between the arc-column-shaped lenses and reduce the periodical contrast of the emergent light of the respective arc-column-shaped lenses.

In a first embodiment of the present invention, each of the hetero-components is formed of a transparent substrate layer. The substrate layer has a thickness ranging from 5 μm to 100 μm and a width ranging from 1/30 to 1/4 a width of the pixels of a corresponding display. The substrate layer is made of an optical material.

In a second embodiment of the present invention, each of the hetero-components is formed of a triangular prism and the arc-column-shaped lenses and the triangular prisms are alternately arranged. Each of the triangular prisms has a base edge in parallel to the polarization component. An apex angle of each of the triangular prisms ranges from 15 degrees to 120 degrees, while a base angle of each of the triangular prisms ranges from 30 degrees to 83 degrees. The length of the base edge of each of the triangular prisms ranges from 1/20 to 1/4 the period of the arc-column-shaped lenses.

In a third embodiment of the present invention, each of the hetero-components is formed of a transparent dispersion layer with scattering effect. The dispersion layer is made of a transparent material doped with particulates. The particulates are randomly arranged in the transparent material. The particulates have a refractive index different from a refractive index of the transparent material. A rough face is formed on a surface of the dispersion layer. The rough face is formed of any of refractive concaved face, refractive convex face, reflective concaved face and reflective convex face The present invention can be best understood through the following description and accompanying drawings, wherein:

DETAILED DESCRIPTION OF THE PREFERRED EMBODIMENTS

Figure 1:
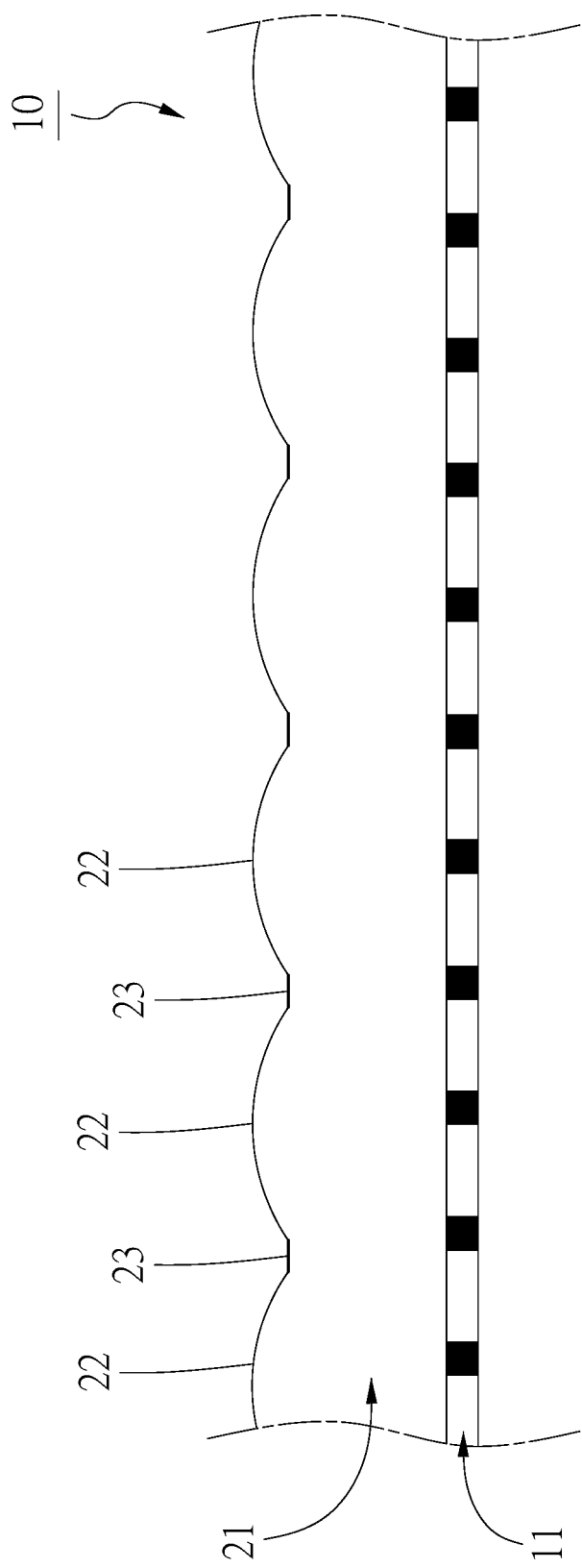
FIG. 1 is a schematic diagram showing the structure of a first embodiment of the present invention.
Figure 2:
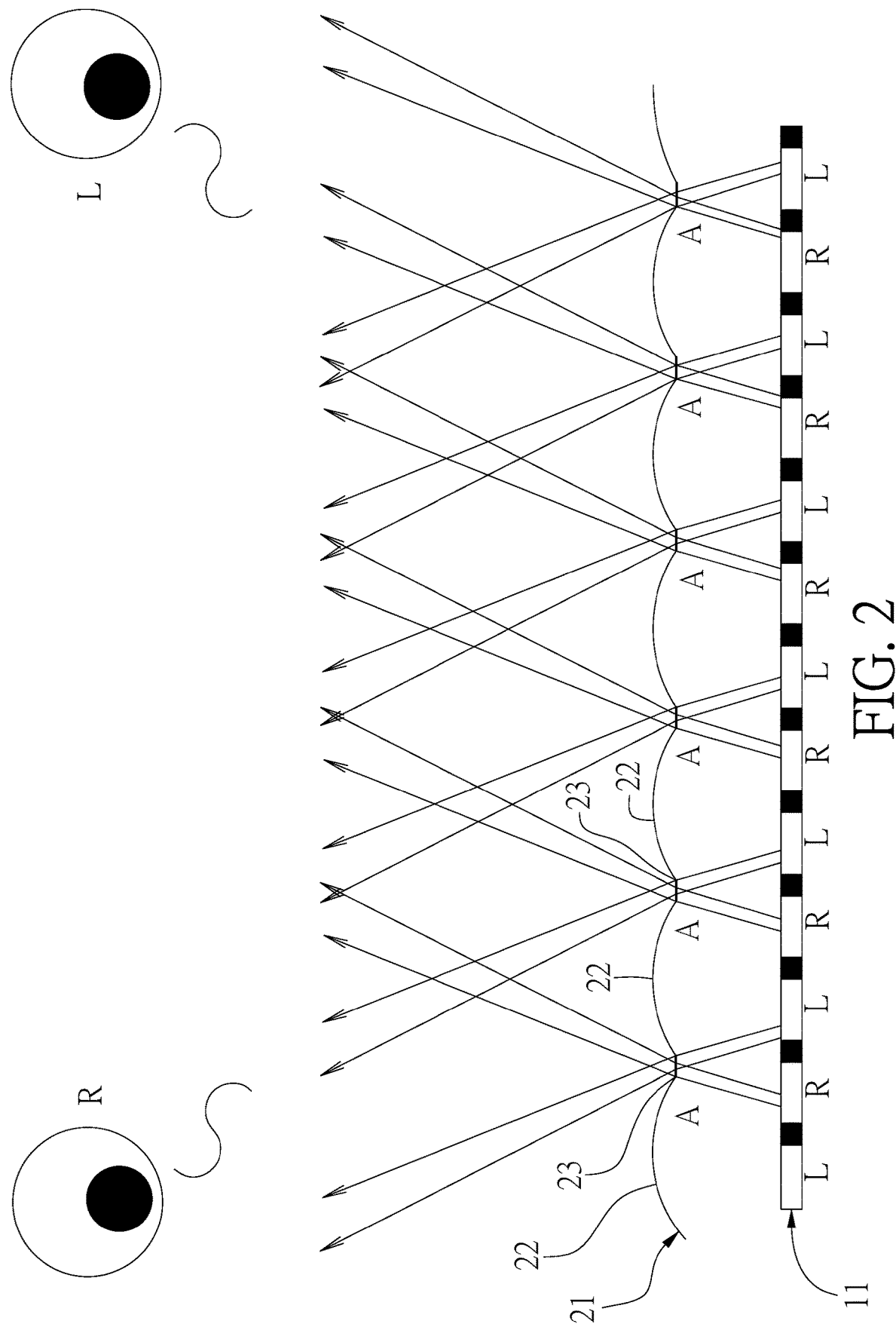
FIG. 2 is a schematic diagram according to FIG. 1, showing the light path of the first embodiment of the present invention.

Please refer to FIGS. 1 and 2, which show a first embodiment of the naked-eye 3D display film structure 10 of the present invention. According to the first embodiment, the naked-eye 3D display film structure 10 of the present invention mainly includes a polarization component 11 and a light column lens assembly 21 overlaid on the polarization component 11. One side of the polarization component 11 of the naked-eye 3D display film structure 10 is attachable to a display (not shown), whereby the naked-eye 3D display film structure 10 can be externally attached to the display. By means of the naked-eye 3D display film structure 10, the display can present a stereo vision effect for an observer to normally watch without wearing any additional accessory.

The polarization component 11 can be a barrier grating formed of a polarizer with alternately arranged black and white stripes. The light column lens assembly 21 has multiple arc-column-shaped lenses 22 sequentially connected with each other. A hetero-component 23 is disposed between each two adjacent arc-column-shaped lenses 22. The arc-column-shaped lenses 22 and the hetero-components 23 are sequentially connected with each other and periodically arranged. The hetero-components 23 serve to enhance the intensity of the emergent light outgoing from the gaps A periodically arranged between the arc-column-shaped lenses 22 and reduce the periodical contrast of the emergent light of the respective arc-column-shaped lenses 22. In the first embodiment, each of the hetero-components 23 is formed of a transparent substrate layer. The substrate layer is disposed between each two adjacent arc-column-shaped lenses 22. The substrate layer is made of an optical material (such as optical-order PET material). The substrate layer has a thickness ranging from 5 µm to 100 µm and a width ranging from 1/30 to 1/4 a width of the pixels of the corresponding display.

Please further refer to FIG. 2. In the first embodiment, the thickness of the hetero-component 23 formed of the substrate layer is selectively 5 µm, while the width of the pixels of the display ranges from 10 µm to 500 µm and the width of the substrate layer is selectively 25 µm. The hetero-components 23, (that is, the substrate layers), are periodically arranged between the arc-column-shaped lenses 22 so that the gaps between the adjacent arc-column-shaped lenses 22 are such changed that the light beams passing through the gaps, (that is, the positions where the hetero-components 23 are arranged), are partially respectively deflected to a left eye and a right eye of an observer by way of scattering. Therefore, the distribution of the emergent light outgoing from the periodically arranged arc-column-shaped lenses 22 is changed from an original high contrast of the emergent light passing through the polarizer with alternately arranged black and white stripes into a lower contrast of the emergent light passing through the polarizer with alternately arranged black and white stripes, (that is, the dark areas become brighter). Accordingly, the contrast of the Moiré pattern produced by the periodically arranged pixels can be effectively reduced. In the conventional naked-eye 3D display film, the period of the light columns is proximate to or times the period of the pixels so that when the light columns are superimposed onto the pixels, a high-contrast Moiré pattern is produced to result in poor naked-eye 3D effect. To solve the above problem of the conventional naked-eye 3D display film, the present invention provides the naked-eye 3D display film structure 10, which can effectively reduce the contrast of the Moiré pattern and minify the susceptibility of human eyes to the Moiré pattern so as to effectively enhance the naked-eye observation 3D image quality and effect.

Figure 3:
FIG. 3 is a schematic diagram showing the light path of a second embodiment of the present invention.
Figure 3:
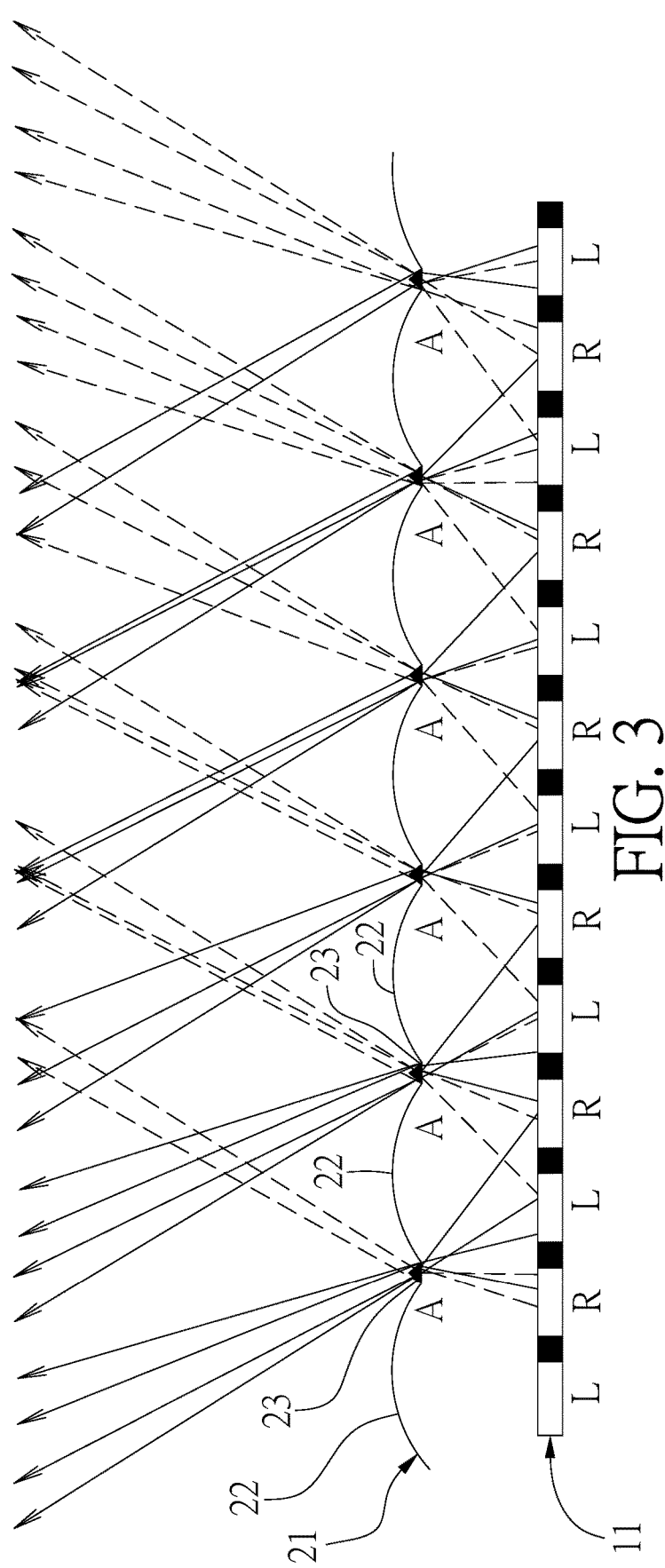

Please now refer to FIG. 3, which shows a second embodiment of the present invention. The second embodiment is different from the first embodiment in that each of the hetero-components 23 of the second embodiment is formed of a triangular prism. The arc-column-shaped lenses 22 and the triangular prisms are alternately arranged. A base edge of each of the triangular prisms is in parallel to an extending direction of the polarization component 11. An apex angle of each of the triangular prisms ranges from 15 degrees to 120 degrees, while a base angle of each of the triangular prisms ranges from 30 degrees to 83 degrees. The length of the base edge of each of the triangular prisms ranges from 1/20 to 1/4 the period of the arc-column-shaped lenses 22.

In the second embodiment, the apex angle of each of the triangular prisms is selectively 120 degrees, while the base angle is selectively 30 degrees. The length of the base edge of each of the triangular prisms is 1/20 the period of the arc-column-shaped lenses 22. The triangular prism is arranged between each two adjacent arc-column-shaped lenses 22.

Accordingly, the light beams incident upon the hetero-component 23 formed of the triangular prism will be totally reflected or refracted according to the position where the light beams are incident. That is, in the case that the light beams come from a pixel farther away from the gap, the light beams will be refracted by the hetero-component 23 formed of the triangular prism and projected to the left and right eyes. In the case that the light beams come from a pixel closer to the gap, the light beams will be totally reflected by the hetero-component 23 formed of the triangular prism and also projected to the left and right eyes. In the second embodiment of the present invention, the light beams passing through the gaps are deflected and projected to the left and right eyes. This also can enhance the intensity of the emergent light outgoing from the periodically arranged gaps A and destruct the forming condition of the Moiré pattern so as to minify the susceptibility of human eyes to the Moiré pattern. Therefore, the second embodiment also can effectively enhance the naked-eye observation 3D image quality and effect.

Figure 4:
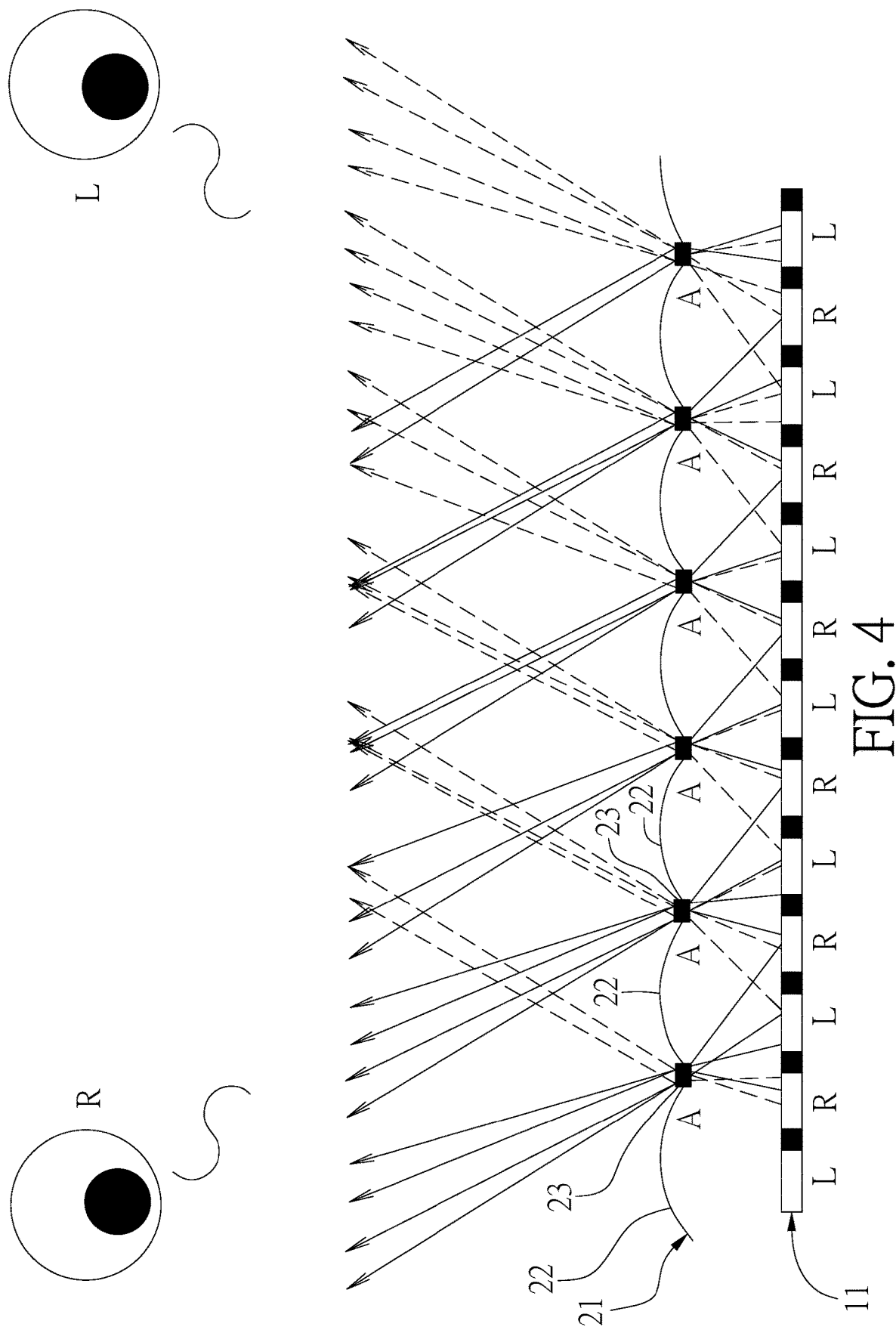
FIG. 4 is a schematic diagram showing the light path of a third embodiment of the present invention.
Figure 5:
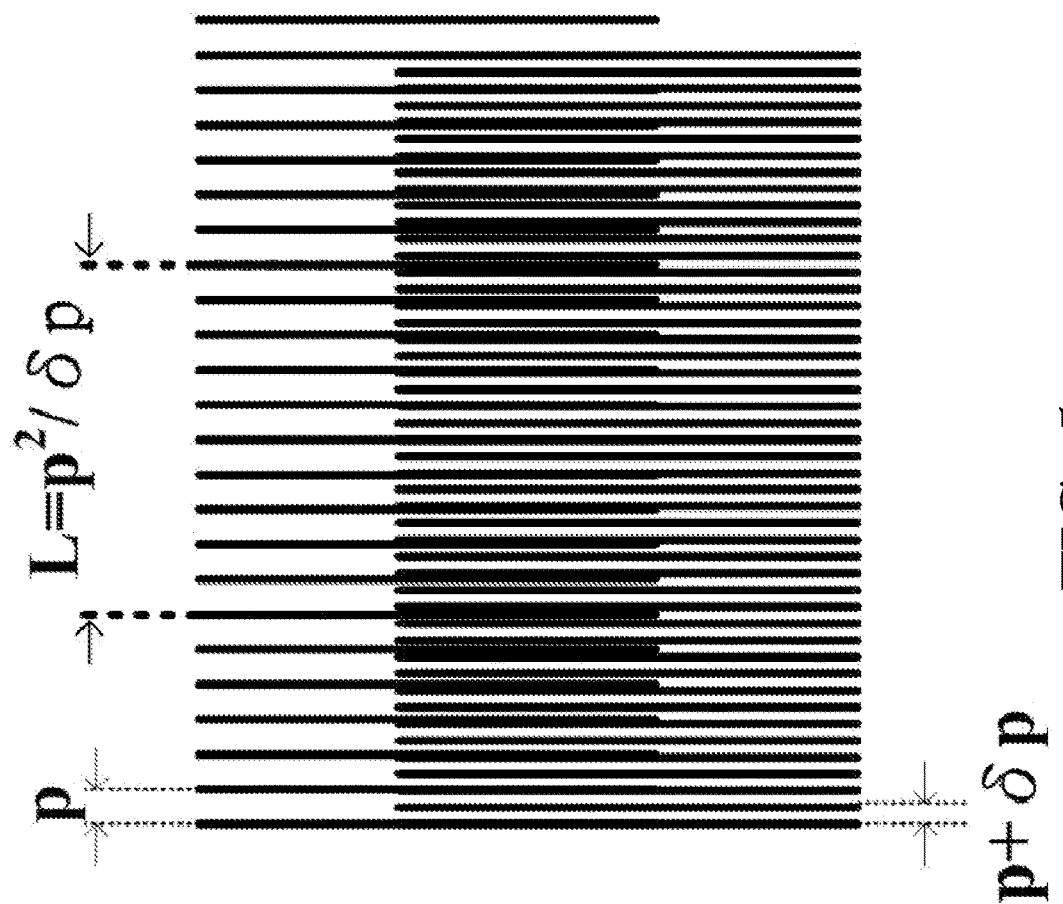
FIG. 5 is a schematic diagram showing the production principle of the Moiré pattern.
Figure 6:
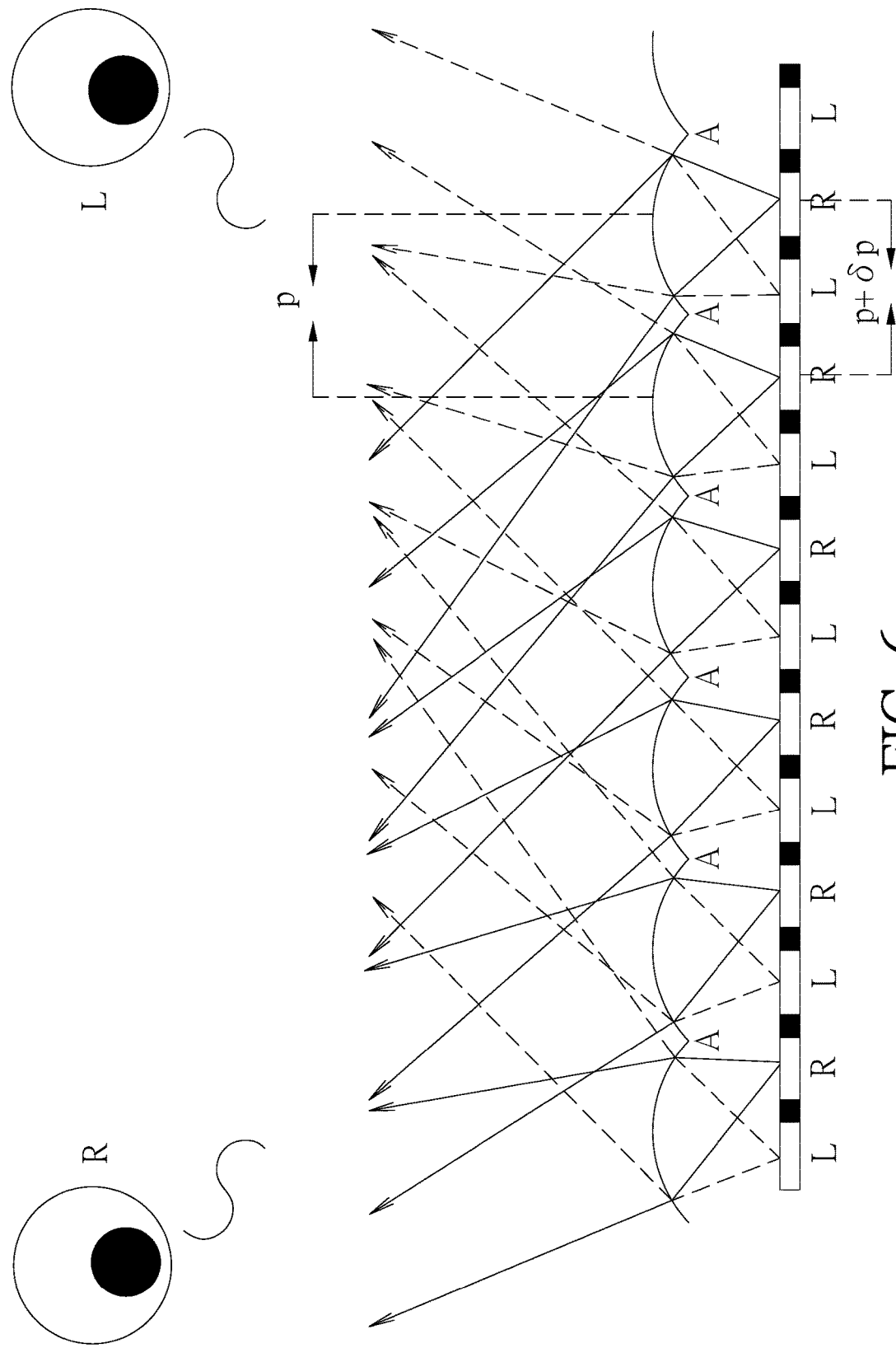
FIG. 6 is a schematic diagram showing the light path of a conventional column-shaped lens grating for achieving stereo vision.

Please now refer to FIG. 4, which shows a third embodiment of the present invention. The third embodiment is different from the first embodiment in that each of the hetero-components 23 of the third embodiment is formed of a transparent dispersion layer. A base edge of each of the dispersion layers is in parallel to the polarization component 11. The dispersion layer is selectively made of a material with scattering effect, such as a transparent material doped with particulates. The particulates are randomly doped and arranged in the transparent material. The particulates have a refractive index different from a refractive index of the transparent material. The difference between the refractive index of the particulates and the refractive index of the transparent material ranges from 0.01 to 0.2. In addition, a rough face is formed on a surface of the dispersion layer. The rough face includes refractive concaved face, refractive convex face, reflective concaved face or reflective convex face, whereby the incident light beams passing through the hetero-components 23 formed of the dispersion layers can be scattered and projected into a perception range of human eyes. In the third embodiment of the present invention, the light beams passing through the gaps are deflected and projected to the left and right eyes. This also can enhance the intensity of the emergent light outgoing from the periodically arranged gaps A and make the previously seen dark areas become brighter as well as destruct the forming condition of the Moiré pattern so as to minify the susceptibility of human eyes to the Moiré pattern. Therefore, the third embodiment also can effectively enhance the naked-eye observation 3D image quality and effect.

The above embodiments are only used to illustrate the present invention, not intended to limit the scope thereof. Many modifications of the above embodiments can be made without departing from the spirit of the present invention.

What is claimed is:

1. A naked-eye 3D display film structure comprising a polarization component and a light column lens assembly overlaid on the polarization component, wherein:

the light column lens assembly has multiple arc-column-shaped lenses sequentially connected with each other, a hetero-component being disposed between each two adjacent arc-column-shaped lenses, the arc-column-shaped lenses and the hetero-components being sequentially connected with each other and periodically arranged, the hetero-components serving to enhance the intensity of the emergent light outgoing from the gaps periodically arranged between the arc-column-shaped lenses and reduce the periodical contrast of the emergent light of the respective arc-column-shaped lenses.

2. The naked-eye 3D display film structure as claimed in claim 1, wherein each of the hetero-components is formed of a transparent substrate layer.

3. The naked-eye 3D display film structure as claimed in claim 2, wherein the substrate layer has a thickness ranging from 5 μm to 100 μm and a width ranging from 1/30 to 1/4 a width of the pixels of a corresponding display.

4. The naked-eye 3D display film structure as claimed in claim 2, wherein the substrate layer is made of an optical material.

5. The naked-eye 3D display film structure as claimed in claim 1, wherein each of the hetero-components is formed of a triangular prism and the arc-column-shaped lenses and the triangular prisms are alternately arranged.

6. The naked-eye 3D display film structure as claimed in claim 5, wherein each of the triangular prisms has a base edge with a length ranging from 1/20 to 1/4 the period of the arc-column-shaped lenses.

7. The naked-eye 3D display film structure as claimed in claim 5, wherein the base edge of each of the triangular prisms is in parallel to the polarization component, an apex angle of each of the triangular prisms ranging from 15 degrees to 120 degrees, while a base angle of each of the triangular prisms ranging from 30 degrees to 83 degrees.

8. The naked-eye 3D display film structure as claimed in claim 7, wherein each of the triangular prisms has a base edge with a length ranging from 1/20 to 1/4 the period of the arc-column-shaped lenses.

9. The naked-eye 3D display film structure as claimed in claim 1, wherein each of the hetero-components is formed of a transparent dispersion layer with scattering effect.

10. The naked-eye 3D display film structure as claimed in claim 9, wherein the dispersion layer is made of a transparent material doped with particulates, the particulates being randomly arranged in the transparent material, the particulates having a refractive index different from a refractive index of the transparent material.

11. The naked-eye 3D display film structure as claimed in claim 9, wherein a rough face is formed on a surface of the dispersion layer, the rough face being formed of any of refractive concaved face, refractive convex face, reflective concaved face and reflective convex face.

* * * * *